United States Patent [19]

Caveney

[11] 4,012,300

[45] Mar. 15, 1977

[54] METHOD OF ALTERING THE FRIABILITY OF ABRASIVE PARTICLES

[76] Inventor: Robert John Caveney, 57 Victoria Ave., Sandringham, Johannesburg, Transvaal, South Africa

[22] Filed: Feb. 18, 1975

[21] Appl. No.: 550,577

[30] Foreign Application Priority Data

Feb. 22, 1974 South Africa .................... 74/1183

[52] U.S. Cl. .................................... 204/157.1 H
[51] Int. Cl.² ......................................... B01J 1/10
[58] Field of Search ............................ 204/157.1 H

[56] References Cited

UNITED STATES PATENTS 2,945,793  7/1960  Dugdale .................... 204/157.1 H Primary Examiner—Howard S. Williams
Attorney, Agent, or Firm—Cushman, Darby & Cushman

[57] ABSTRACT

The invention provides a method of altering the friability of abrasive particles particularly diamond and cubic boron nitride particles, by subjecting the particles to selected irradiation capable of producing internal defects in the particles. The irradiation is preferably a neutron flux.

5 Claims, No Drawings

METHOD OF ALTERING THE FRIABILITY OF ABRASIVE PARTICLES

This invention relates to abrasive particles, particularly diamond particles.

According to the invention, there is provided a method of altering the friability of an abrasive particle including the steps of selecting an irradiation capable of causing internal defects in the particle and subjecting the particle to that irradiation to an extent sufficient to cause a desired alteration in the friability of the particle.

Obviously, the particle should as far as possible be substantially free of inclusions which, when subjected to the irradiation, will become radioactive for a period, e.g. weeks, which render the particle unsuitable for commercial applications. For this reason, if the abrasive particle is diamond, natural diamond is preferred.

The irradiation of the abrasive particle causes internal defects or interstitials and vacancies or agglomerates thereof to be produced in the particle so altering its friability. The friability of abrasive particles can be measured by the commercially available Friatest method. In this test, a sample of the abrasive particles of particular particle size is placed in a capsule with a hard steel ball and shaken for a predetermined period of time. The abrasive particles are then removed from the capsule and screened through the next smaller screen size than was used as the smaller of the two screens used for determining the screen size of the original particles. The amount retained on the screen divided by the weight of the original sample gives a value R. The friability or Friatest Index (F.T.I.) of the particle may then be calculated from the following formula:

$$\text{Friatest Index (F.T.I.)} = \frac{t}{\log_e (100/R)}$$

where t is the time of shaking in the capsule. The higher the F.T.I. the less friable the particle and hence the higher its impact resistance.

Apparatus for performing the Friatest is available from De Beers Industrial Diamond (Ireland) Limited, Shannon Airport, Ireland.

The irradiation may be a flux of particles such as protons or neutrons or may be gamma irradiation. The irradiation is preferably a flux of neutrons. When a flux of particles is used, the integrated flux is preferably from $10^{17}$ to $10^{20}$, more preferably $10^{18}$, particles/cm$^2$. The source of irradiation may be any known in the art.

The invention finds particular application with diamond and cubic boron nitride and more particularly, with diamond of the MD or SD type or tool stone diamonds, which hereinafter will be included in the term "SD type". MD (or metal bond) and SD (or saw) type diamonds are commercially available and are generally of blocky shape and high impact resistance, i.e. low friability. They are readily distinguishable from another type of commercially available diamond, RD or resin bond diamond, which are friable and irregular in shape. Diamond of the various types are distinguishable visually by means of a microscope and by their Friatest indices.

MD particles are used in abrasive tools such as metal bond grinding wheels and electroplated tools whereas SD particles are used in saws, drill bits and so on. RD particles are most generally employed in resin bond grinding wheels.

In the case of MD and SD particles, it is desirable to increase their impact resistance so that wear in use tends to occur by abrasion processes rather than by fracture. The impact resistance of MD and SD particles can be increased by the method of the invention. In particular, it has been found that subjecting the particles to neutron integrated fluxes of $10^{18}$ neutrons/cm$^2$ markedly increases their impact resistance.

In the case of diamonds, the particles are preferably natural.

It has further been found that subjecting the irradiated particles to heat treatment in a non-oxidising atmosphere such as a vacuum of $10^{-4}$ mm Hg or better, argon, neon, or hydrogen alters the friability of the particles. The heat treatment must take place in the temperature range 500° C to 1600° C, preferably in the range 500° C to 1000° C. In particular, in the case of MD and SD particles, neutron integrated fluxes of greater than $10^{20}$ neutrons/cm$^2$ result in a lowering of the impact resistance of the particle. Subsequent heat treatment in the above described manner, however, causes an increase in the impact resistance.

The following examples illustrate the invention:

EXAMPLE 1

Natural RD diamond grit of size 120/140 U.S. mesh was subjected to various neutron bombardments in a nuclear pile. The flux of neutrons consisted of high energy and thermal neutrons. Thereafter, the particles were subjected to various heat treatments in vacuums of $10^{-4}$ mm Hg. The results are given in the table below:

|  | Friatest Index F.T.I. | Density gm/cc | After heat treatment (in vacuo) | | | |
|---|---|---|---|---|---|---|
|  |  |  | 500° C for 1 hr. | | 1000° C for 1 hr. | |
|  |  |  | F.T.I. | Density | F.T.I. | Density |
| No irradiation | 119 | 3.52 | — | — | — | — |
| $10^{17}$ neutron/cm$^2$ | 140 | 3.52 | 130 | 3.52 | 148 | 3.52 |
| $10^{18}$ | 147 | 3.52 | 138 | 3.52 | 151 | 3.52 |
| $10^{19}$ | 153 | 3.52 | 146 | 3.52 | 140 | 3.52 |
| $10^{20}$ | 149 | 3.40 | 155 | 3.51 | 152 | 3.52 |

From the above it will be seen that the friability of the RD particles decreased when subjected to neutron fluxes of lower than $10^{20}$ neutrons/cm$^2$. At higher integrated fluxes the friability increased, but could be restored by heat treatment. It will also be noted from the above results that an increase in friability is accompanied by a decrease in density of the particle.

EXAMPLE 2

In a similar manner to example 1, a further sample of natural RD diamond (120/140 U.S. mesh) was subjected to a neutron integrated flux of $10^{18}$ neutrons/cm$^2$. It was found that the F.T.I. of the particles increased from 108 to 127.

EXAMPLE 3

Natural SD diamond grit of size U.S. 30/40 U.S. mesh was subjected to a neutron integrated flux of 10$^{18}$ neutrons/cm$^2$. This treatment resulted in an increase in the F.T.I. of the particles from 33.2 to 36.2.

Saws were manufactured using both the irradiated and the unirradiated particles. The saws were 40 cm saws, each with 24 segments. The matrix was a cobalt based matrix and the diamond concentration was 35.

The blades were tested on Norite employing a peripheral speed of 39.8 mm/sec and a cutting rate of 333.0 mm$^2$/sec.

In the case of the saws containing the irradiated particles, the average wear in mm/m$^2$ sawn of sixteen runs was 0.44. In comparison, saws containing unirradiated particles had an average wear of 0.64 over the same number of runs. Expressed differently the saws containing the irradiated particles had a blade life, expressed in m$^2$ sawn/mm wear, of 22.5 as against a blade life of 15.6 for the saws containing the unirradiated diamonds.

I claim:
1. A method of decreasing the friability of diamond particles selected from SD, MD and RD diamond particles including the step of subjecting the particles to an irradiation capable of causing internal defects in the particles and consisting of an integrated flux of particles in the range 10$^{17}$ to 10$^{20}$ particles/cm$^2$ or gamma irradiation.
2. A method of claim 1 wherein the irradiation is an integrated flux of particles of 10$^{18}$ particles/cm$^2$.
3. A method of claim 2 wherein the irradiation is an integrated flux of neutrons.
4. A method of claim 1 wherein the irradiation is an integrated flux of neutrons.
5. A method of claim 4 wherein the diamond particles are natural diamond particles.

* * * * *